United States Patent [19]

Diekman

[11] Patent Number: 4,556,230
[45] Date of Patent: Dec. 3, 1985

[54] BICYCLE KICKSTAND

[75] Inventor: Robert L. Diekman, Centerville, Ohio

[73] Assignee: The Huffy Corporation, Miamisburg, Ohio

[21] Appl. No.: 707,708

[22] Filed: Mar. 4, 1985

[51] Int. Cl.$^4$ .............................................. B62H 1/02
[52] U.S. Cl. .................................... 280/301; 280/293
[58] Field of Search ........................ 280/293, 301, 303

[56] References Cited

U.S. PATENT DOCUMENTS

| 1,584,096 | 5/1926 | Henderson | 280/301 |
| 2,202,426 | 5/1940 | Pawset | 280/301 |
| 2,268,051 | 12/1941 | Miller | 280/301 |

*Primary Examiner*—Joseph F. Peters, Jr.
*Assistant Examiner*—Donn McGiehan

*Attorney, Agent, or Firm*—Biebel, French & Nauman

[57] ABSTRACT

A bicycle kickstand which is adapted to attach to the cross brace of the chain stays of a bicycle frame. The kickstand is of the type having a housing with a transverse flange at an upper end which extends beneath the chain stays and a leg pivotally attached to the housing. The kickstand attaches to the cross brace by a lower jaw which is attached to the midportion of the flange, an upper jaw and a bolt which adjustably attaches the upper jaw to the lower jaw so that the jaws may be clamped against the cross brace. In a preferred embodiment, each of the jaws includes a concave clamping surface shaped to matingly engage the cross brace and provide a relatively large area of contact, thereby reducing the clamping force required to attach the kickstand to the frame securely.

11 Claims, 7 Drawing Figures

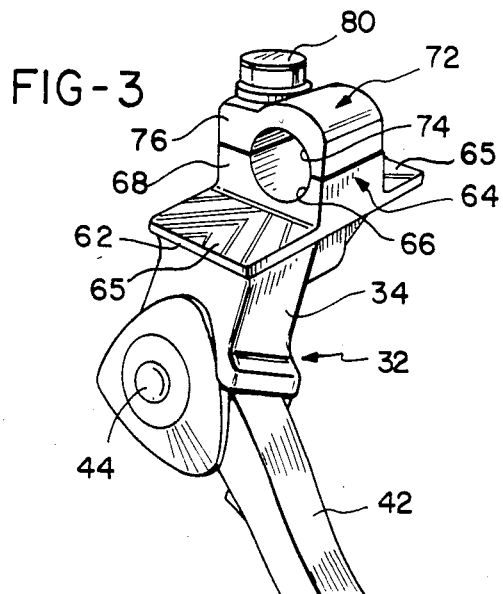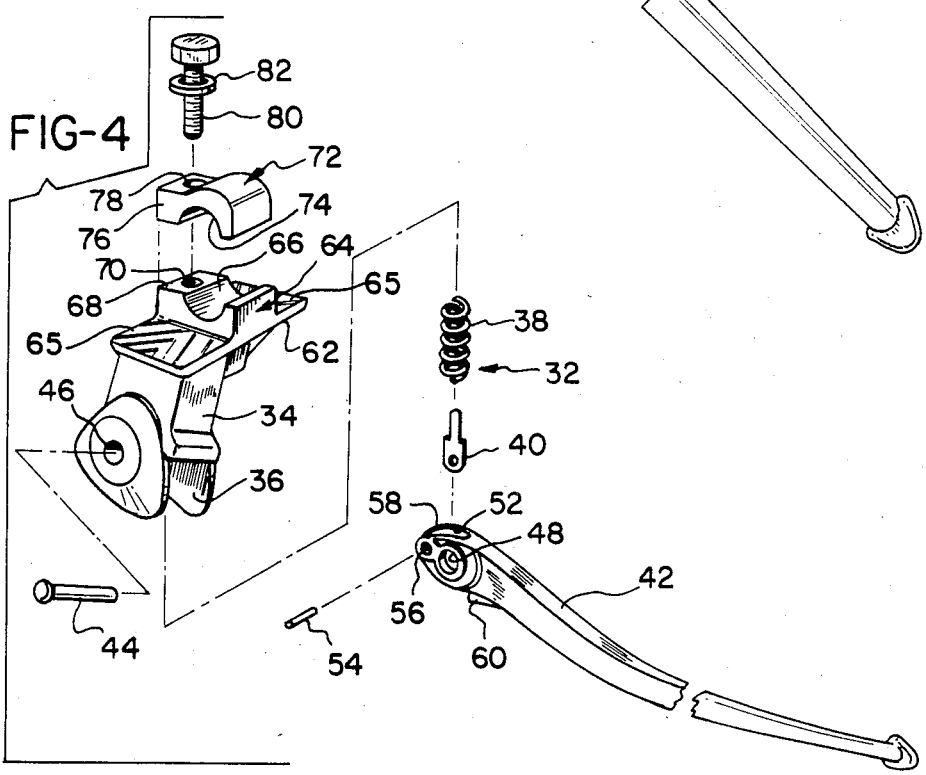

BICYCLE KICKSTAND

BACKGROUND OF THE INVENTION

The present invention relates to kickstands for bicycles and, more particularly, to kickstands which are removably attachable to the frame of a bicycle.

Although some bicycles currently in use employ kickstands which are welded to or are otherwise made an integral part of their frames, the majority employ kickstands which are removably attached to their frames. Removable kickstands are advantageous in that they do not require attachment at the factory by the manufacturer but may be made elsewhere and included with the unassembled bicycle to be attached by the purchaser. Furthermore, a removable kickstand may be replaced easily if damaged.

A typical kickstand currently in use is shown in FIGS. 1 and 2 of the drawings. Briefly described, that kickstand includes a housing, a leg pivotally attached to the housing and positionable in raised and lowered configurations by a spring and cam arrangement, a lower flange attached to the housing and an upper flange attached to the lower flange by a threaded bolt. The upper and lower flanges are shaped to engage the chain stays of a bicycle frame at a location adjacent to the bottom bracket which supports the crank assembly of the bicycle, and the kickstand is attached to the frame by the clamping engagement of the upper and lower flanges against the chain stays.

Ideally, the upper and lower flanges are oriented substantially perpendicularly to and extend above and below the elongate chain stays. However, repeated use or an insufficient clamping force exerted by the flanges may result in the kickstand gradually sliding rearwardly along the chain stays or the flanges becoming skewed relative to the stays. This sliding movement of the kickstand may cause the flanges to scrape the paint from the chain stays, thereby marring the finish of the bicycle frame. Furthermore, should the flanges become skewed relative to the chain stays, the kickstand leg tip may contact and damage the rear wheel when the bicycle is ridden with the kickstand leg pivoted to the raised position.

The only method of preventing such damage with that type of kickstand is to tighten the clamping bolt securely. However, this may cause the upper and lower flanges to compress and permanently deform the chain stays, and possibly gouge paint in the area of contact between the chain stays and flanges. Accordingly, there is a need for a kickstand which is attachable to a bicycle frame in such a manner that the likelihood of the kickstand sliding rearwardly on the chain stays or becoming skewed relative to the chain stays is substantially reduced. There is also a need for a kickstand which is readily attachable to and detachable from a bicycle frame but does not mar the finish of the frame.

SUMMARY OF THE INVENTION

The present invention is a kickstand for a bicycle which is attachable to the chain stay cross brace and therefore cannot slide along the chain stays of the bicycle frame, or become skewed relative to the chain stays. The kickstand includes a body having a transverse flange at an upper end which is sized to extend beneath the chain stays, a leg pivotally attached to the lower end, and upper and lower jaws which are shaped to engage the chain stay cross brace. The lower jaw is attached to the housing at a midportion of the transverse flange and includes an upwardly facing, concave lower clamping surface shaped to matingly engage the underside of the cross brace.

The upper jaw includes a downwardly facing, concave upper clamping surface shaped to matingly engage the upper portion of the cross brace. The upper jaw includes a hole through which a bolt is inserted and threaded into the lower jaw. The upper jaw hole is sized so that the upper jaw may be pivoted into opposing relation to the lower jaw.

When the upper and lower jaws are clamped against the cross brace by the bolt, the transverse flange engages the undersides of the chain stays to prevent the kickstand from pivoting about the cross brace. The upper and lower clamping surfaces engage the cross brace over a relatively large area in comparison to prior art kickstands, so that the force applied to the cross brace per unit area is less for a given clamping force. This reduces the likelihood that the finish of the cross brace will be marred. Furthermore, since the upper and lower jaws engage the cross brace in a substantially cylindrically-shaped area of contact, the likelihood of the kickstand skewing relative to the chain stays is much less than prior art kickstands in which the areas of contact lie along the upper and lower surfaces of the chain stays.

Accordingly, it is an object of the present invention to provide a kickstand for a bicycle which can be attached and removed rapidly and easily from a bicycle frame; a kickstand which is attachable to a bicycle frame such that the likelihood of the kickstand being displaced toward the rear wheel, and thereby marring the finish of the frame, as a result of prolonged use is minimized; a kickstand which is attachable to a bicycle frame such that the likelihood of the kickstand skewing relative to the chain stays as a result of prolonged use is minimized; and a kickstand which can be attached securely to the chain stays of a bicycle frame without having to apply an excessive clamping force by the clamping members of the kickstand.

Other objects and advantages of the invention will become apparent in the following description, the accompanying drawings and the appended claims.

BRIEF DESCRIPTION OF THE DRAWINGS

FIG. 3 is a perspective view of a preferred embodiment of the kickstand of the present invention, in which the kickstand leg is partially broken away;

FIG. 4 is an exploded perspective view of the kickstand of FIG. 3;

DETAILED DESCRIPTION OF THE PREFERRED EMBODIMENT

Figure 1:
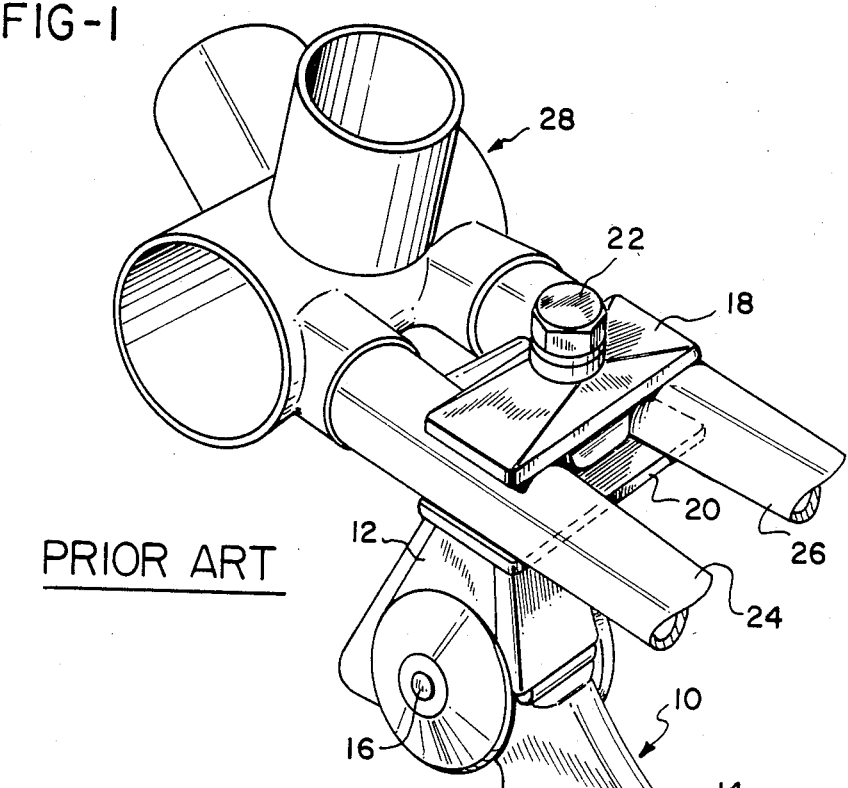
FIG. 1 is a detail perspective view showing a prior art kickstand attached to the chain stays of a bicycle frame.
Figure 2:
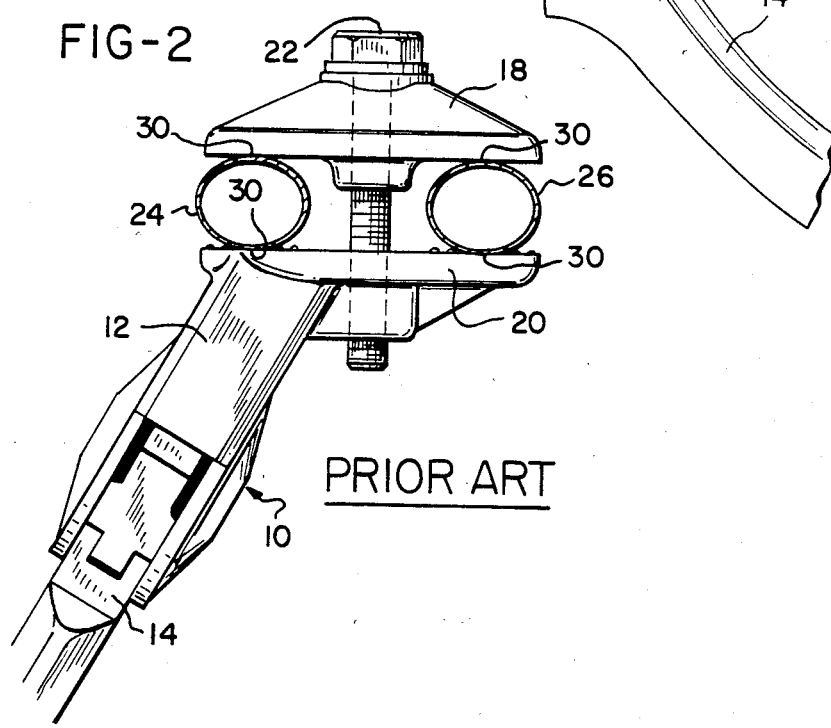
FIG. 2 is a detail end elevation of the prior art kickstand of FIG. 1, in which the chain stays are shown in section.

In order to distinguish the advantages of the kickstand of the present invention from prior art kickstands, a typical prior art kickstand is illustrated in FIGS. 1 and 2. That bicycle kickstand, generally designated 10, includes a housing 12, a leg 14 pivotally attached to the housing by a pin 16 and upper and lower clamping members 18, 20 held together by a bolt 22 threaded into the housing. Although not shown in FIGS. 1 and 2, the leg 14 is held in a raised or a lowered position by a spring and cam combination which is well-known in the art, and is shown in greater detail in FIG. 4.

The upper and lower jaws 18, 20 are shaped to extend transversely across the chain stays 24, 26 of a bicycle frame, generally designated 28. As best shown in FIG. 2, the prior art kickstand 10 contacts the chain stays 24, 26 at linear areas 30 located along the top and bottom surfaces of the chain stays. Because the areas 30 are relatively small, a relatively large clamping pressure must be applied by the jaws 18, 20 to prevent the kickstand 10 from moving relative to the chain stays 24, 26. This requires severe tightening of the bolt 22, and may result in the portions of the chain stays 24, 26 contacted by the jaws 18, 20 to become somewhat flattened and assume an oval shape, as shown in FIG. 2.

In some instances the deformation of the chain stays 24, 26 at this location may become permanent, should the compressive forces cause deformation of the chain stays beyond their elastic limit. Furthermore, any movement of the kickstand 10 relative to the chain stays 24, 26 will cause the paint in the areas of contact 30 to be scraped away, which not only lessens the aesthetic appearance of the bicycle frame 28, but creates areas in which rust and corrosion is likely to occur.

The preferred embodiment of the kickstand of the present invention, generally designated 32, is shown in FIGS. 3 and 4. The kickstand 32 includes a housing 34 having a leg recess 36 which receives a helical spring 38 and spring guide 40. A kickstand leg 42 is pivotally attached to the housing 34 by a pin 44 which extends through holes 46, 48 in the housing and leg, respectively. The leg 42 also includes a slot 50 which receives a lower end of the spring guide 40, which is retained by a pin 54 which extends through a hole 56 in the leg end.

The leg end of the leg 42 is eccentrically shaped, and the spring 38 slidably engages its outer surface 58 as the leg is pivoted relative to the housing 34. The downward force exerted by the spring 38 holds the leg 42 in a lowered position or in a raised position. The leg includes a stop 60 which contacts the housing 34 when the leg 42 is in a lowered position. This portion of the kickstand 32 is well-known and is typical of many high quality kickstands, such as that shown in FIGS. 1 and 2.

The upper end of the housing 34 includes an integrally formed transverse flange 62, with a lower jaw 64 extending upwardly from its midportion and dividing the flange into a pair of flange members 65 at opposite ends of the flange. The lower jaw 64 includes a semi-cylindrical, concave clamping surface 66 and a boss 68 having a threaded hole 70.

An upper jaw 72 includes an upper concave clamping surface 74 and an upper boss 76 having a hole 78 therethrough. A bolt 80 extends through the upper hole 78 and is threaded into the lower hole 70, thereby clamping the upper and lower jaws 72, 64 together. A lock washer 82 is used to prevent the bolt 80 from inadvertently loosening.

Figure 5:
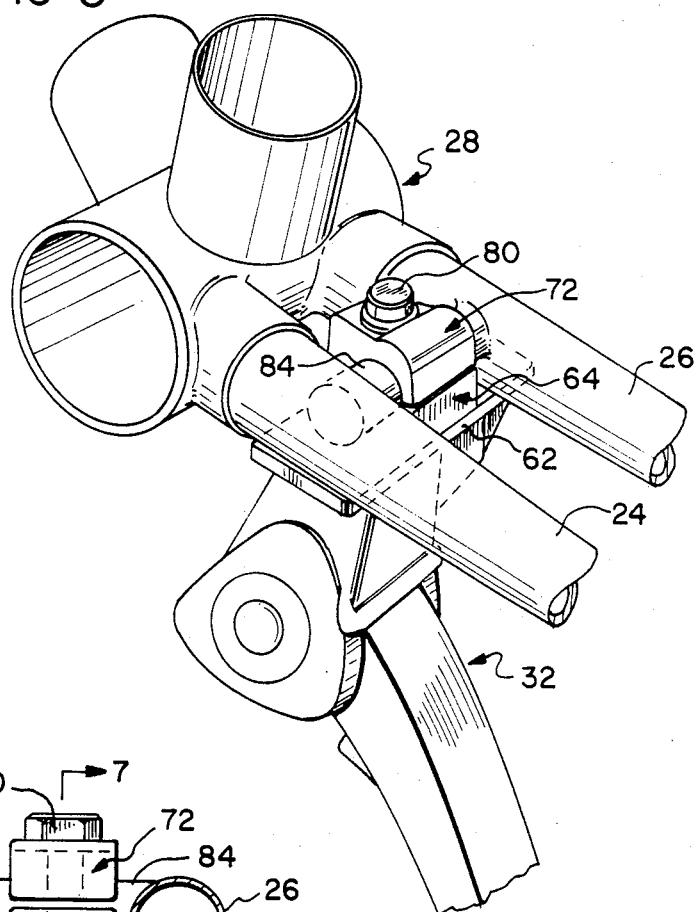
FIG. 5 is a detail perspective view of the kickstand of FIG. 3, shown attached to the chain stays of a bicycle frame.
Figure 6:
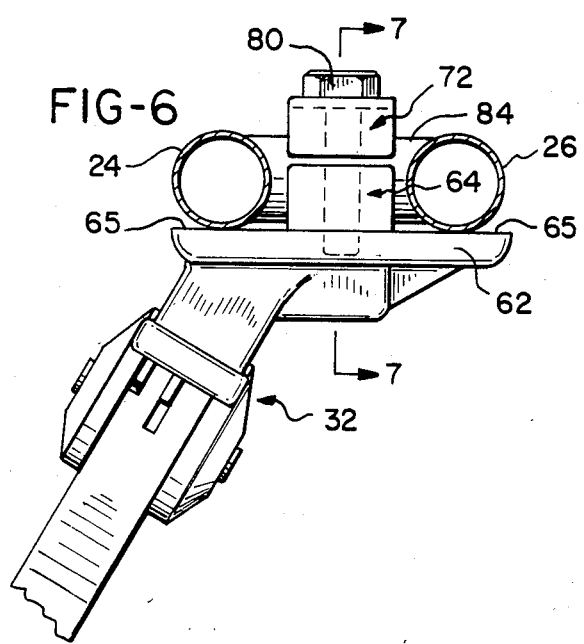
FIG. 6 is a detail end elevation of the kickstand of FIG. 3 attached to the chain stays of a bicycle frame, in which the chain stays are shown in section.

The attachment of the kickstand 32 to a bicycle frame 28 is best shown in FIGS. 5 and 6. The kickstand is first positioned such that the flange members 65 of the transverse flange 62 extend across the undersides of the chain stays 24, 26 such that the underside of the cross brace rests within the clamping surface 66 of the lower jaw 64. The upper jaw 72 is positioned such that the upper clamping surface 74 engages the upper portion of the cross brace 84 and the hole 78 (FIG. 4) is in registry with the threaded hole 70 of the lower jaw 64. The bolt 80 is inserted through the hole 78 and threaded into the hole 70 sufficiently to clamp the upper jaw 72 against the lower jaw 64, thereby locking the cross brace 84 between the two jaws.

Figure 7:
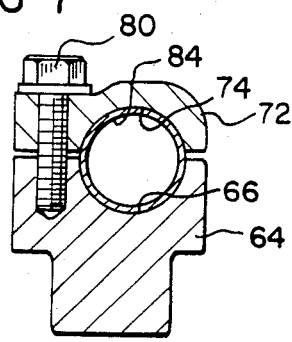
FIG. 7 is a cross section taken at line 7—7 of FIG. 6.

As best shown in FIG. 7, the clamping surfaces 66, 74 of the lower and upper jaws 64, 72, respectively, provide a relatively large surface area of contact with the cross brace 84 of the bicycle frame, when compared to the areas of contact 30 of the prior art kickstands shown in FIGS. 1 and 2. This large, arcuate area of contact prevents the kickstand 32 from skewing relative to the bicycle frame to which it is attached, since the area does not lie in one plane, as in prior art devices. Of course, by attaching directly to the cross brace it is virtually impossible for the kickstand 32 to be displaced longitudinally relative to the chain stays 24, 26 as a result of prolonged use.

An additional advantage of having a relatively large area of contact between the clamping surfaces 66, 74 and the cross brace 84 is that the force per unit area exerted by the jaws 64, 72 upon the cross brace is relatively low when compared to prior art kickstands, thereby minimizing the likelihood of the kickstand marring or chipping the finish in that area. Furthermore, since the area of contact is essentially cylindrical, the need for relatively high clamping forces exerted by the jaws upon the cross brace is eliminated, since the connection between the kickstand and the cross brace is a mechanical interlock as opposed to a frictional clamping engagement as is the case with prior art kickstands.

The flange members 65 contact the undersides of the chain stays 24, 26 and thereby prevent the kickstand from rotating about the cross brace 84. This mechanical stop in the form of the flange members 65 also eliminates the need for the jaws 64, 72 to exert the high clamping forces required to secure prior art kickstands to the chain stays of a bicycle frame.

Although the kickstand 32 may be made of a variety of materials, it is preferable to fabricate the housing, jaws and leg of cast aluminum because of its lightness and cost. Furthermore, since the clamping forces exerted by the jaws upon the cross brace are relatively low, the bolt need not be a high strength or hardened bolt, but may be made of common alloy steels.

While the form of apparatus herein described constitutes a preferred embodiment of the invention, it is to be understood that the invention is not limited to this precise form of apparatus, and that changes may be made therein without departing from the scope of the invention.

What is claimed is:

1. A kickstand of the type having a housing including transverse flange means at an upper end thereof and sized to extend beneath a pair of chain stays, and leg means pivotally attached to said housing, the improvement comprising:

lower jaw means attached to said flange means at substantially a midportion thereof for engaging a chain stay cross brace;

upper jaw means for engaging a chain stay cross brace; and means for adjustably attaching said upper jaw means to said housing such that said upper jaw means may be superposed to said lower jaw means and clamped thereto such that a chain stay cross brace may be held therebetween.

2. The kickstand of claim 1 wherein said lower jaw means divides said flange means into a pair of flange members located at opposite ends of said flange means.

3. The kickstand of claim 2 wherein said upper and lower jaw means include upper and lower concave clamping surfaces, respectively, said clamping surfaces being held in opposing relation by said attaching means.

4. The kickstand of claim 3 wherein said attaching means includes bolt means extending through said upper jaw means and into said housing.

5. The kickstand of claim 4 wherein said upper and lower jaw means include upper and lower lugs, respectively, each receiving said bolt means therethrough.

6. The kickstand of claim 5 wherein said upper lug includes a hole receiving said bolt means therethrough and size to permit relative rotation between said bolt means and said upper jaw means.

7. For use with a bicycle of the type having a bottom bracket, a pair of chain stays extending rearwardly therefrom, and a cross brace extending across the chain stays adjacent to the bottom bracket, a kickstand comprising:

a housing having transverse flange means at an upper end thereof adapted to extend beneath a pair of chain stays;

a lower jaw attached to said flange means at substantially a midportion thereof and having a lower transverse clamping surface shaped to engage a chain stay cross brace;

an upper jaw adjustably attached to said housing and having an upper transverse clamping surface positionable to be superposed to said lower clamping surface and shaped to engage a chain stay cross brace, such that said kickstand is attachable to a bicycle frame so that said flange means engages an underside of a pair of chain stays, and said upper and lower jaws clamp a cross brace therebetween with said clamping surfaces thereof; and leg means pivotally attached to said housing.

8. The kickstand of claim 7 wherein said upper and lower clamping surfaces are concave in shape and are sized to matingly engage a cross brace.

9. The kickstand of claim 8 wherein said upper jaw includes bolt means extending therethrough and threaded into said lower jaw.

10. The kickstand of claim 9 wherein said lower jaw includes a lower lug having a threaded hole to receive said bolt means therein and positioned adjacent to said lower clamping surface, and said upper jaw includes an upper lug having a hole to receive said bolt means therethrough and positioned adjacent to said upper clamping surface.

11. A kickstand of the type having a housing including transverse flange means at an upper end thereof and sized to extend beneath a pair of chain stays, and by means pivotally attached to said housing, the improvement comprising:

lower jaw means attached to said flange means at substantially a midportion thereof for engaging a chain stay cross brace and sized to divide said flange means into a pair of flange members at opposing ends of said flange means, said lower jaw having a lower lug with a threaded hold therethrough and an upwardly-facing, concave lower clamping surface;

upper jaw means having an upper lug with a hole therethrough and a downwardly-facing, concave upper clamping surface; and a bolt extending through said upper lug hole and threaded into said lower lug hole such that said upper jaw means is pivotally attached to said lower jaw means, and said upper clamping surface is movable into opposing relation with said lower clamping surface.

* * * * *

UNITED STATES PATENT AND TRADEMARK OFFICE
CERTIFICATE OF CORRECTION

PATENT NO. : 4,556,230
DATED : December 3, 1985
INVENTOR(S) : Robert L. Diekman

It is certified that error appears in the above-identified patent and that said Letters Patent is hereby corrected as shown below:

Column 3, line 48, delete "leg", first occurrence.

Column 6, line 31, "hold" should be --hole--.

Signed and Sealed this

First Day of April 1986

[SEAL]

Attest:

DONALD J. QUIGG

Attesting Officer

Commissioner of Patents and Trademarks